United States Patent
Hall et al.

(10) Patent No.: US 7,873,739 B2
(45) Date of Patent: Jan. 18, 2011

(54) VOTING MECHANISM FOR TRANSMISSION SCHEDULE ENFORCEMENT

(75) Inventors: Brendan Hall, Eden Prairie, MN (US); Kevin R. Driscoll, Maple Grove, MN (US); Matthias Wachter, Vienna (AT); Harald Angelow, Vienna (AT)

(73) Assignee: Honeywell International Inc., Morristown, NJ (US)

( * ) Notice: Subject to any disclaimer, the term of this patent is extended or adjusted under 35 U.S.C. 154(b) by 1468 days.

(21) Appl. No.: 10/993,910

(22) Filed: Nov. 19, 2004

(65) Prior Publication Data

US 2005/0278457 A1 Dec. 15, 2005

Related U.S. Application Data

(60) Provisional application No. 60/523,896, filed on Nov. 19, 2003, provisional application No. 60/523,783, filed on Nov. 19, 2003.

(51) Int. Cl.
*G06F 15/16* (2006.01)
*H04J 3/16* (2006.01)
*H04B 7/212* (2006.01)

(52) U.S. Cl. ............... 709/230; 709/217; 709/238; 370/345; 370/347; 370/348

(58) Field of Classification Search ................ 709/217, 709/219, 232, 238, 240; 370/411, 458, 282, 370/442–448
See application file for complete search history.

(56) References Cited

U.S. PATENT DOCUMENTS

| | | | | |
|---|---|---|---|---|
| 4,987,571 A * | 1/1991 | Haymond et al. | ........... | 370/445 |
| 5,131,007 A * | 7/1992 | Brown et al. | ................. | 375/267 |
| 5,276,703 A * | 1/1994 | Budin et al. | ................. | 375/130 |
| 5,295,140 A * | 3/1994 | Crisler et al. | ................ | 370/443 |
| 5,353,282 A * | 10/1994 | Dormer et al. | .............. | 370/390 |
| 5,719,858 A * | 2/1998 | Moore | ......................... | 370/347 |
| 6,108,347 A * | 8/2000 | Holmquist | ................... | 370/458 |
| 6,501,765 B1 * | 12/2002 | Lu et al. | ..................... | 370/447 |
| 6,628,629 B1 * | 9/2003 | Jorgensen | ................... | 370/322 |
| 7,006,518 B2 * | 2/2006 | Ornes et al. | .................. | 370/458 |
| 7,359,972 B2 * | 4/2008 | Jorgensen | ................... | 709/226 |
| 2003/0033394 A1 * | 2/2003 | Stine | .......................... | 709/222 |
| 2004/0081193 A1 * | 4/2004 | Forest et al. | ................ | 370/458 |

FOREIGN PATENT DOCUMENTS

| | | |
|---|---|---|
| EP | 0707431 | 4/1996 |
| EP | 0491202 | 6/2002 |
| EP | 1355460 | 10/2003 |
| GB | 2236606 | 4/1991 |
| WO | 0113230 | 2/2001 |

* cited by examiner

*Primary Examiner*—Saleh Najjar
*Assistant Examiner*—Farzana Huq
(74) *Attorney, Agent, or Firm*—Fogg & Powers LLC

(57) ABSTRACT

Method and systems of transmission schedule enforcement in a hub-based network is provided. Method includes receiving guardian messages from one or more of a plurality of nodes, implementing a voting function, voting the received guardian messages using the voting function, and when a clear winner of the received guardian messages is detected, enabling a port indicated by the clear winner to propagate. The guardian messages are received outside of TDMA communications. The guardian messages contain information pertaining to the next slot or slots to transmit.

8 Claims, 5 Drawing Sheets

VOTING MECHANISM FOR TRANSMISSION SCHEDULE ENFORCEMENT

CROSS REFERENCE TO RELATED APPLICATIONS

This application is related to and claims the benefit of the filing date of U.S. Provisional Application No. 60/523,896, entitled "VOTING MECHANISM FOR TRANSMISSION SCHEDULE ENFORCEMENT," filed on Nov. 19, 2003, and U.S. Provisional Application No. 60/523,783, entitled "PARASITIC TIME SYNCHRONIZATION FOR A CENTRALIZED TDMA BASED COMMUNICATIONS GUARDIAN," filed on Nov. 19, 2003, both of which are incorporated herein by reference.

This application is related to the following applications, filed on even date herewith, all of which are hereby incorporated by reference:

U.S. patent application Ser. No. 10/993,221 entitled "PARASITIC TIME SYNCHRONIZATION FOR A CENTRALIZED TDMA BASED COMMUNICATIONS GUARDIAN".

U.S. patent application Ser. No. 10/993,926 entitled "PRIORITY BASED ARBITRATION FOR TDMA SCHEDULE ENFORCEMENT IN A DUAL CHANNEL SYSTEM,".

TECHNICAL FIELD

The following description relates generally to communication systems and in particular, to distributed fault-tolerant communication systems.

BACKGROUND

Distributed, fault-tolerant communication systems are used, for example, in applications where a failure could possibly result in injury or death to one or more persons. Such applications are referred to here as "safety-critical applications." Examples of safety-critical applications are in a system that is used to monitor and manage sensors and actuators included in an airplane or other vehicle. One example of a safety-critical application is in a system that is used to monitor and manage sensors and actuators included in the fields of automotive, aerospace electronics, medical, industrial control, and the like.

One architecture that is commonly considered for use in such safety-critical applications is the Time-Triggered Architecture (TTA). TTA, TTP/C, and TTP/A are described in specifications promulgated by TTTech Computertechnik AG. TTP/C uses time-division multiple access (TDMA) as the medium access strategy where each node is permitted to periodically utilize the full transmission capacity of the bus for some fixed amount of time called a TDMA slot. Thus as long as each node uses only its statically assigned slot, collision free access to the bus can be ensured.

Many systems today operate with complex electronics systems that have the capability to support operations and maintenance functions. For example the aerospace industry supports an electronics architecture for safety and non-safety critical systems. Other industries including automobile and industrial equipment can benefit from similar electronics architecture. Electronics architectures include time division multiple access (TDMA) based communication protocols. These electronics architecture have required independent guardian components to contain erroneous component behavior and maintain communications availability. In high volume applications the guardian application is often centralized to reduce costs.

To date the implementation of a centralized bus guardian function for time division multiple access (TDMA) based communication protocols, requires the guardian to have independent knowledge of the communication schedule and timing parameters, such as slot order, transmission start time, etc. This has required the guardian functionality to incorporate non-volatile storage, and has resulted in complicated programming requirements for the guardian based data. It has further introduced the possibility of failure in the form of inconsistency between the guardian and the nodes it is protecting. In addition, this strategy requires the guardian to maintain a state, in the form of transmission order and current slot position, which leaves the implementation vulnerable to state upsets, such as those induced by high energy neutrons. Also with the centralization of the protection mechanism, the guardians themselves become critical architecture components. Therefore the complexity of the guardian design may be a significant issue in the safety critical domain. In certain domains gate level failure analysis may be required, in which case the complexity of the guardian will have significant financial impact.

Therefore, there is a need in the art to reduce the complicated programming requirements for the guardian.

SUMMARY

A method of transmission schedule enforcement in a hub-based network is provided. The method includes receiving guardian messages from one or more of a plurality of nodes, implementing a voting function, voting the received guardian messages using the voting function, and when a clear winner of the received guardian messages is detected, enabling a port indicated by the clear winner to propagate. The guardian messages are received outside of TDMA communications. The guardian messages contain information pertaining to the next slot or slots to transmit.

A network is provided. The network includes at least one hub having a central guardian and a plurality of nodes coupled to the at least one hub over multiple channels. The plurality of nodes communicate using a time-triggered TDMA protocol. Each central guardian implements schedule enforcement between one or more of the plurality of nodes over one of the multiple channels. The schedule enforcement comprises voting guardian messages received from the one or more of the plurality of nodes per channel. Each guardian message received from the one or more of the plurality of nodes indicates a vote of one or more slots expected to transmit next.

DETAILED DESCRIPTION

Figure 1:
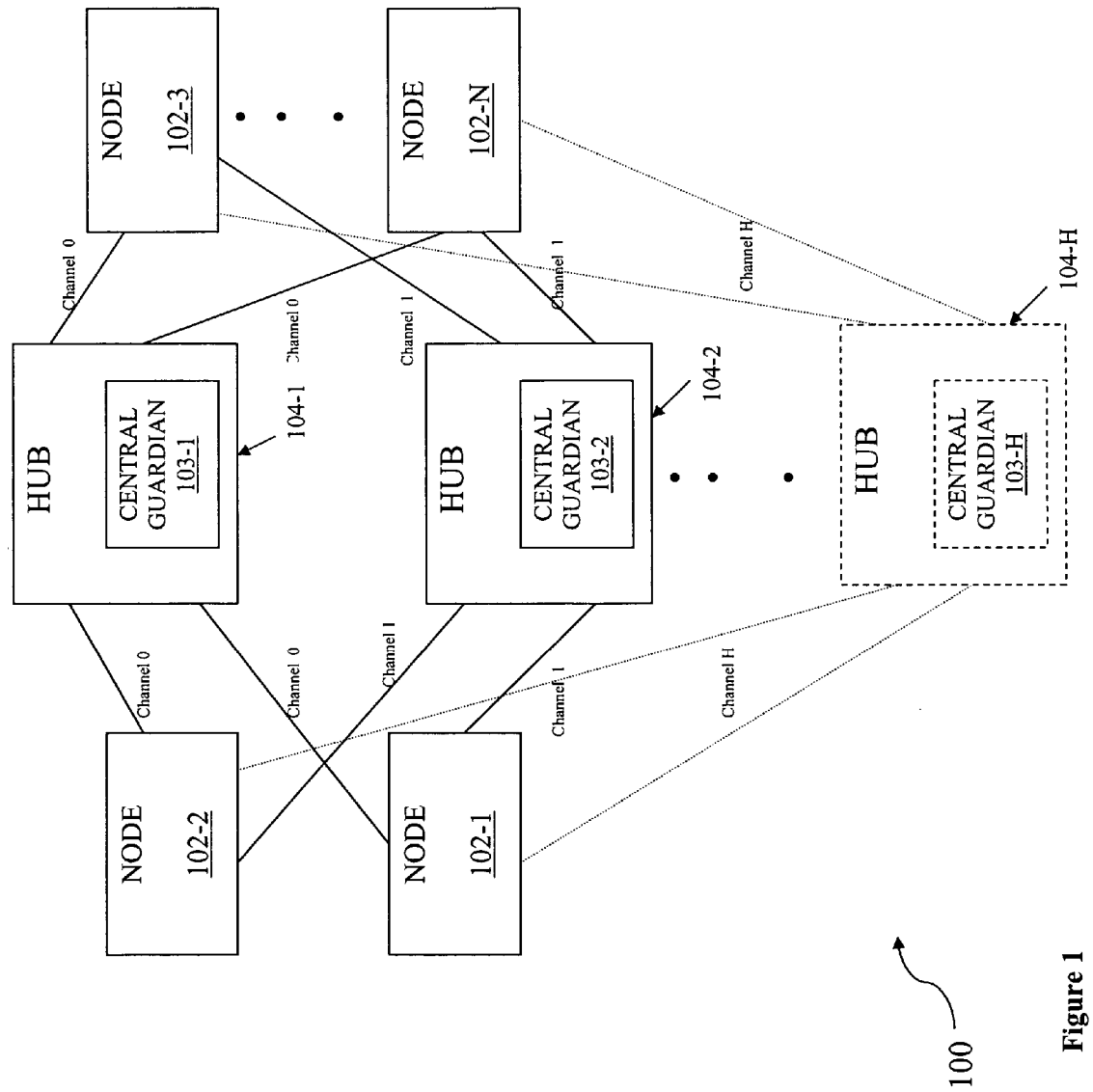
FIG. 1 is a block diagram of one embodiment of a communication network according to the teachings of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention include a mechanism that enables a guardian to implement schedule order enforcement without the need of centralized schedule knowledge nor persistent schedule position related state. Instead, a fault tolerant method utilizing the member nodes of the system as a source of the schedule communications pattern is presented.

In one embodiment, schedule enforcement is achieved as follows:—At predefined points in a communication schedule e.g. at a point just prior to the beginning of a TDMA slot, every node, or a subset of nodes, in the system sends a short message, a guardian message, to the central guardian. The guardian does not propagate these messages, since they are solely used by the guardian itself. The content of the message is dependent on the details of the implementation. In its simplest manifestation the information sent corresponds to which port of the central guardian is expected to carry the next transmission i.e. the port that is connected to the node that according to the global communications scheme is scheduled to transmit next. On receipt of the messages, the central guardian votes the inputs and if a clear winner is established, i.e. there is a majority of the nodes indicating agreement on the next port for transmission, the guardian enables this port to propagate during the next slot. In one embodiment, the majority of nodes is based upon a single fault tolerance assumption, a dual fault tolerance assumption, or a multi-fault tolerance assumption. In a single fault tolerant system a majority comprises at least two nodes indicating agreement. In a dual fault tolerance system a majority comprises at least three nodes indicating agreement. In a multi-fault tolerant system a majority comprises at least n+1 nodes indicating agreement where n is equal to the number of faults. In operation, in one embodiment, as soon as at least n+1 votes are detected that indicate agreement a majority is determined and the guardian enables the winning port to propagate during the next slot.

In another embodiment, information sent from the nodes to the guardian may also correspond to a node's ID, or slot position. In this case the guardian performs a simple look-up and determines the required port to propagate based on the node's ID, slot position or the like. Information regarding the location of the look-up table is further described with respect to FIG. 1 below.

In one embodiment, a network consists of a plurality of electronic modules called nodes that are connected by one or more channels. In one embodiment, the nodes are connected by two replicated channels. In one embodiment, these channels are called channel 0 (or channel A) and channel 1 (or channel B). Embodiments of the network are configured in a star configuration, or the like. In one embodiment, the network is configured in a star configuration coupled to one or more bus networks and the nodes of the bus network do not transmit guardian messages unless one of the nodes of the bus network communicates on behalf of other nodes on the bus. In this embodiment the bus nodes are not protected to the same degree as the other hub nodes, since they share a common medium.

FIG. 1 is a block diagram of one embodiment of a hub-based network, shown generally at 100. Network 100 includes a plurality of nodes 102-1 to 102-N. In one embodiment, network 100 is a dual channel network and each node 102-1 to 102-N is coupled to hubs 104-1 to 104-2 over replicated channels 0 and 1, respectively. Network 100 is expandable to a network having H replicated channels with nodes 102-1 to 102-N coupled to hubs 104-1 to 104-H over 0 to H channels, respectively. For ease of discussion, network 100 will be described based on a dual channel system and it is understood that the concepts described are transferable to a network expanded to operate over H channels. In one embodiment, nodes 102-1 to 102-N communicate with one another over two replicated communication channels 0 and 1 using time-triggered communication protocol, though a different number and/or type of nodes 102 and/or channels are used in other embodiments.

In one embodiment, network 100 operates with any TDMA protocol and hybrid TDMA protocols that allow time-triggered and asynchronous messages to be shared. In one embodiment, each node 102-1 to 102-N has been assigned a transmission slot order. In one embodiment, each node of nodes 102-1 to 102-N scheduled to transmit during a transmission round may transmit more than once per round as each slot is assigned a node for transmission.

Hubs 104-1 and 104-2 each include a central guardian 103-1 and 103-2 that operates to enforce the transmission schedule. In one embodiment, central guardians 103-1 and 103-2 are central guardian functions that operate in software, hardware or some combination of software and hardware. Central guardian 103-1 operates to enforce the transmission schedule on channel 0 between nodes 102-1 to 102-N, or a defined subset of nodes 102-1 to 102-N. Central guardian 103-2 operates to enforce the transmission schedule on channel 1 between nodes 102-1 to 102-N, or a defined subset of nodes 102-1 to 102-N. In operation, in one embodiment, nodes 102-1 to 102-N replicate the transmission schedule over dual channels 0 and 1 or multi-channels 0 to H. In an alternate embodiment, the number of nodes 102-1 to 102-N, or defined subset of nodes 102-1 to 102-N, transmitting on channels 0 and 1 or channels 0 to H within any period of the transmission schedule may be different.

In one embodiment, data is transmitted in frames from one node to another 102-1 to 102-N in network 100. Each node 102 transmits to both hubs 104-1 and 104-2. Hubs 104-1 and 104-2 relay received data transmissions according to the transmission schedule. In one embodiment, guardian messages are included in transmissions received by the respective central guardians 103-1 to 103-2 and are not relayed by hubs 104-1 to 104-2. In this embodiment, the guardian messages are dedicated messages that are not included in the TDMA data frames.

In operation, at predefined points in the communication schedule every node 102-1 to 102-N, or a subset of nodes 102-1 to 102-N, sends a guardian message to central guardian 103-1 and 103-2 indicating the next port to communicate. For example, in one embodiment, a single n-bit message is sent containing the next port to communicate. In one embodiment, this transmission happens at a point just prior to a TDMA slot, at the start of every slot.

In one embodiment, the single n-bit message includes overhead error detecting or correcting codes. In one embodiment, this error code may be a cyclic redundancy code. In other embodiments this may be simple checksum or parity codes. In an alternate embodiment, guardian messages received by central guardian 103-1 and 103-2 do not include any CRC codes and error detection is based on receiving multiple guardian messages that agree via a bit-for-bit comparison. Since the source of the guardian messages are from independent paths, as with a single fault assumption system, such messages may be assumed to be error free if they agree.

In alternate embodiments, the guardian message comprises a portion of a transmission schedule indicating the next x ports to communicate and is transmitted just prior to the start of transmission of the x slots. In an alternate embodiment, the guardian message is transmitted at a coordinated time in the transmission schedule such as once per round indicating the slot order for an entire round. In this embodiment, the guardian message includes slot length information for the transmissions. In one embodiment, hubs 104-1 and 104-2 require a notion of the slot length to increment the slot position. In one embodiment, beacons or actions signals, are used to increment the slot position. In an alternate embodiment, hubs 104-1 and 104-2 utilize their local time and the slot length to increment the slot position.

In one embodiment, nodes 102-1 to 102-N, or defined subset of nodes 102-1 to 102-N, transmit a guardian message indicating the one or more slots to communicate next and each respective central guardian 103-1 and 103-2 converts the slots to the associated port. In another embodiment, the guardian message indicates the node ID of the one or more nodes expected to transmit. In this embodiment, the intelligence to convert the slot or node ID to the associated port resides in the central guardian 103-1 and 103-2.

In one embodiment, one or more look-up tables, containing the desired information, is included in the hub 104-1 and 104-2. In alternate embodiments, the central guardian 103-1 and 103-2 attains the look-up tables at start-up, votes table data sent from multiple nodes 102-1 to 102-N using a voting function, receives the table data prior to the commencement of the TDMA communication sequence, or the like.

When nodes 102-1 to 102-N, or a defined subset of nodes 102-1 to 102-N, transmit a guardian message indicating the port expected to carry the next transmission the central guardian 103-1 and 103-2 does no conversion. In this embodiment, the intelligence to convert the slot to the associated port resides at each of the nodes 102-1 to 102-N. This requires each node 102-1 to 102-N to basically know what port he is in the hub network. In this embodiment, a slot to guardian port look-up table is included in each node 102-1, to 102-N. In alternate embodiments, the slot to guardian port look-up table for each node 102-1 to 102-N, is attained at start-up, is attained prior to the commencement of the TDMA communication sequence, or the like.

In operation, central guardians 103-1 and 103-2 receive the respective guardian messages and if everyone agrees, per channel, on which port is to communicate next then the communication proceeds for that channel. As a result, schedule related state information is not required to be maintained between slots when performing transmission schedule enforcement for each slot.

In one embodiment, there is a single fault assumption so only one of the guardian messages received by the associated guardians 103-1 and 103-2 can be in error. In one embodiment, when a discrepancy between one node and other nodes who voted, on an associated channel, is detected, central guardian 103 disregards the discrepancy. In one embodiment, network 100 operates on a single fault assumption and only one discrepancy in votes received from nodes 102-1 to 102-N, or some subset of 102-1 to 102-N, per channel, is tolerated. If more than one discrepancy in votes is received, the respective central guardian 103 determines the next action to take.

In one embodiment, a subset of nodes 102-1 to 102-N is indicated as schedule masters and transmits guardian messages to vote on the next port to transmit on behalf of all nodes in network 100.

In one embodiment, the data transmissions from nodes 102-1 to 102-N include beacons or action time signals. In one embodiment, guardian messages are transmitted with one or more beacon signals. In one embodiment, the guardian messages are utilized as the beacon or action signals for time synchronization.

In one embodiment, the guardian messages are sent over the same communication medium as other frames exchanged between plurality of nodes 102-1 to 102-N and the hubs 104-1 and 104-2. In other embodiments, the guardian messages are sent over a different communication medium.

In one embodiment, communication links between hub 104-1 and nodes 102-1 to 102-N or hub 104-2 and nodes 102-1 to 102-N are half duplex links. In embodiments employing half duplex links, information about the length of the scheduled transmission is important for transmission schedule enforcement. In one embodiment, the guardian messages include a voting message and how long the next communication is. The voting message includes one of port, slot position, node ID, and the like indicating one or more slots to communicate next. As a result, the hub 104-1 or 104-2 will begin listening for signals indicating the next transmission after the scheduled length of the previous transmission.

In an alternate embodiment, voting schedule enforcement is implemented in hub-based network 100 by voting guardian messages comprising full transmission schedules sent from nodes 102-1 to 102-N or a subset of nodes 102-1 to 102-N. In one embodiment, the transmission schedules are sent by nodes 102-1 to 102-N at start-up. In one embodiment, a bit by bit comparison of the transmission schedules is performed by central guardians 103-1 and 103-2, per respective channel, and a voting function is executed. In one embodiment, the voting function is a majority voting function. When a clear winner is obtained the winning transmission schedule is implemented. When no clear winner is obtained guardians 103-1 and 103-2 determine the next action to take.

Central guardians 103-1 and 103-2 use one or more fault tolerance selections for voting. In one embodiment, just before the enforcement of the schedule the guardian reviews guardian messages received and executes a voting function. As a result, you are sure that everyone who could cast a vote has had time to cast a vote. In one embodiment, the voting function tolerates only a single discrepancy. In another embodiment, the voting function tolerates F number of faults, wherein F<the number of nodes. In another embodiment, the voting function is a majority voting function, a sequential voting function, or the like. In alternate embodiments, once the guardian 103-1 and 103-2 receives a predetermined number of similar votes, without waiting for all of the votes, enables communication on the indicated port. In another embodiment, a sequential voting function is implemented where the first vote is received and stored when a second vote is received that matches the first vote communication is enabled. It is understood that any voting function may be implemented. It is understood that embodiments with multiple hubs may implement the same or different voting functions per hub.

Embodiments of the present invention allow the removal of the centralized guardian's requirement to incorporate schedule knowledge of the communications scheme and facilitate a much simpler, with much reduced state, design that is more tolerant to single event upsets (SEUs). The embodiments that perform schedule enforcement once per slot minimize state and reduce SEU vulnerability as each slot is voted without history and as a result the system is less vulnerable to state upsets since it will be corrected in the next slot. In embodiments that perform schedule enforcement once per round the state is persistent for the round.

In one embodiment, guardian messages are embedded within the TDMA communication. In operation each central guardian 103-1 and 103-2 listens and includes circuitry for each node 102-1 to 102-N that extracts the guardian message from the TDMA communication, feeds those into logic implemented with a voting function that determines if there is a winner and when a winner is identified causes the selected port to be opened for transmission. Prior to performing the voting, the guardian correlates and aligns the guardian messages it has received from the multiple TDMA slots. In one embodiment, full transmission schedules are transmitted with the TDMA communication. In one embodiment a sub-set of the full TDMA transmission schedule is transmitted with the TDMA communication. In one embodiment, the communication schedule for an entire round is sent in guardian messages at a co-ordinated point at the start of the round.

In one embodiment, a pre-determined portion of a subsequent transmission schedule is included in an embedded guardian message of one or more slots of a current transmission. In one embodiment, the portions are assembled to create a full transmission schedule with some overlap and a selection function is used for schedule order enforcement. In one embodiment, time synchronization is implemented to enable communication to flow as transmission schedule information is accumulated. In one embodiment, the synchronization is parasitic time synchronization. In one embodiment, the voting function for the schedule enforcement is as discussed above with dedicated guardian messages.

Figure 2:
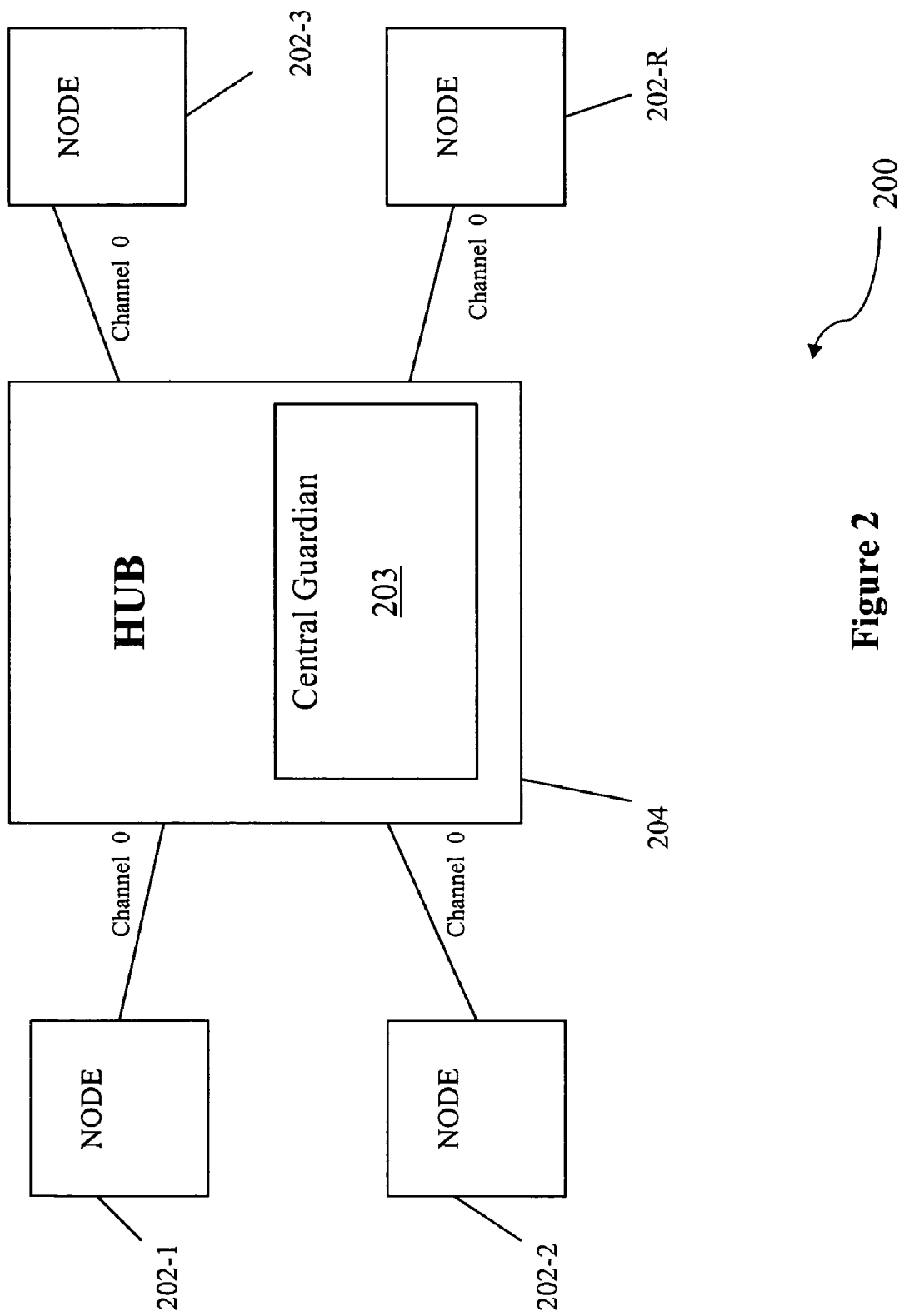
FIG. 2 is a block diagram of another embodiment of a communication network according to the teachings of the present invention.

FIG. 2 is a block diagram of one embodiment of a hub-based network, shown generally at 200. Network 200 includes a plurality of nodes 202-1 to 202-N. Each node 202 is coupled to hub 204 over channel 0. Network 200 operates as a single channel system. In one embodiment, network 200 operates on a time division multiple access (TDMA) based communication protocol. It is understood that network 200 may operate on an alternate communication protocols. Hub 204 needs limited knowledge of the transmission schedule in order to enforce TDMA bus access cycle.

Hub 204 includes a central guardian 203 that operates to enforce the transmission schedule. In one embodiment, central guardian 203 is a central guardian function that operates in software, hardware or some combination of software and hardware. Central guardian 203 operates to enforce the transmission schedule on channel 0 between nodes 202-1 to 202-R. In one embodiment, data is transmitted in frames from one node to another node in network 200.

In one embodiment, network 200 operates as described with respect to network 100 of FIG. 1 above. Alternately network 200 operates as a single channel system.

Figure 3:
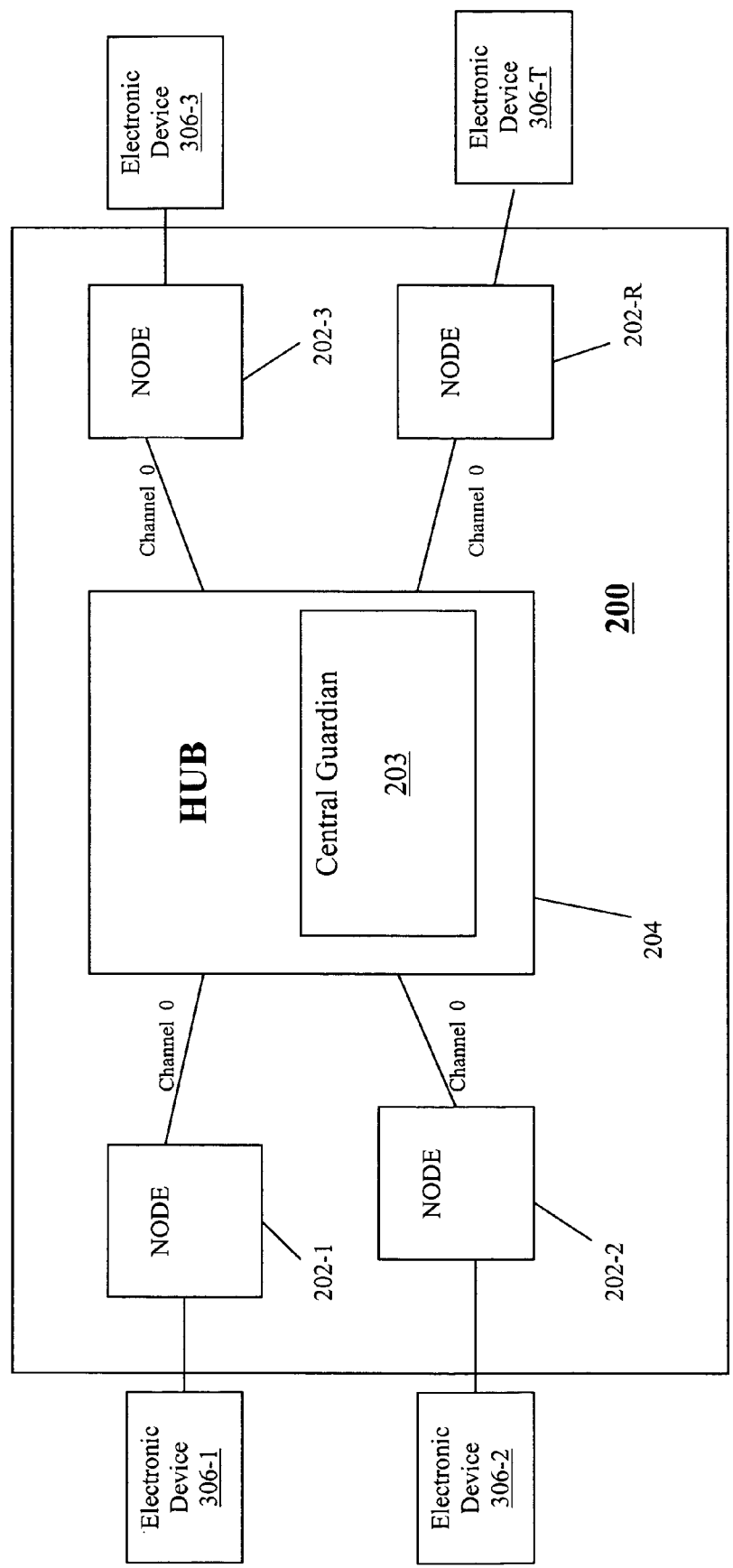
FIG. 3 is a block diagram of another embodiment of a communication network according to the teachings of the present invention.

FIG. 3 is a block diagram of a system indicated at 300 that uses a communication network 200 of the type described above with respect to FIG. 2. FIG. 3 further shows that nodes 202-1 to 202-R are connected to a number of electronic devices 306-1 to 306-P. In one embodiment, electronic devices 306-1 to 306-P include sensors, processors, actuators, controllers, input devices and the like that communicate data in frames over network 200.

Figure 4:
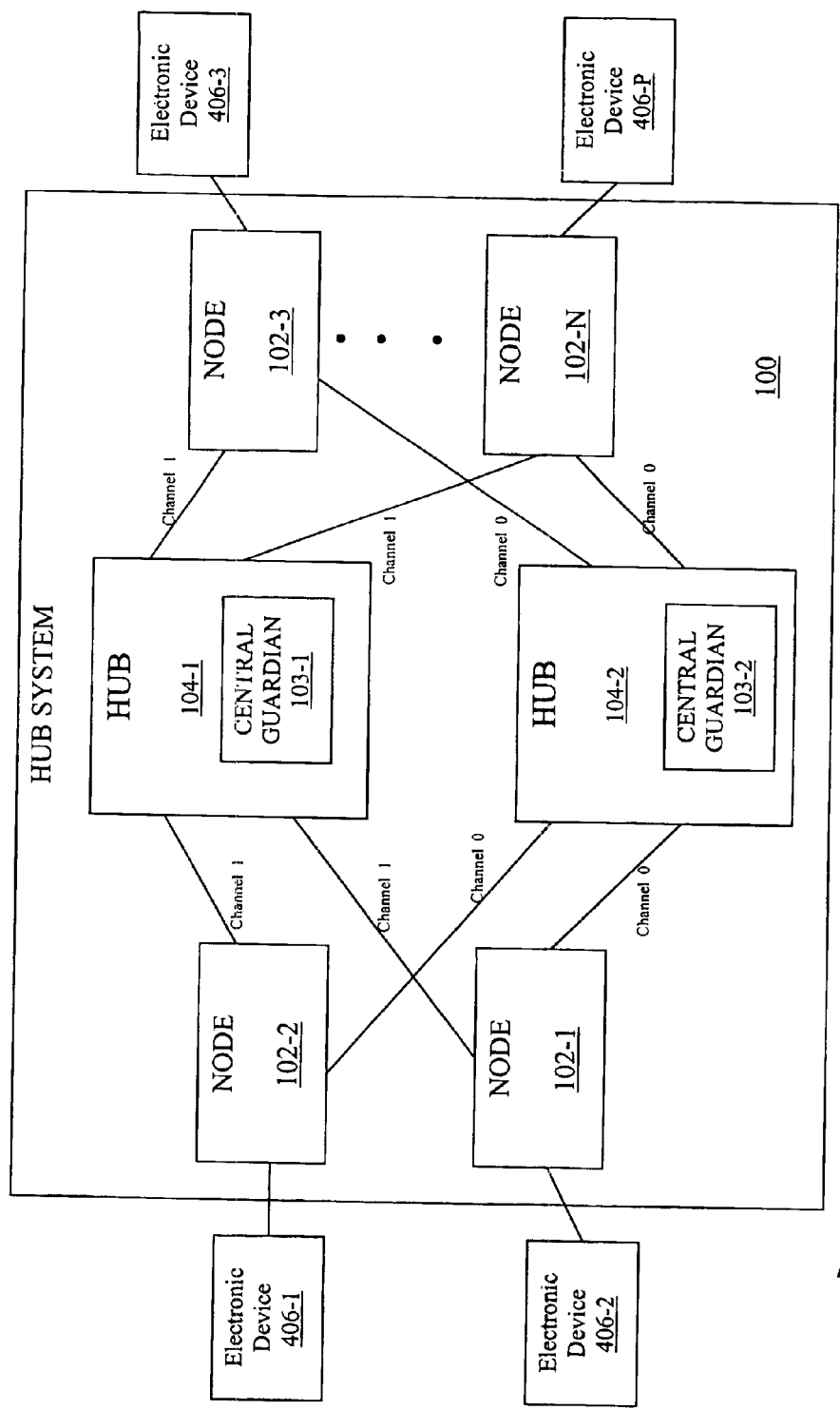
FIG. 4 is a block diagram of an alternate embodiment of a communication network according to the teachings of the present invention.

FIG. 4 is a block diagram of a system indicated at 400 that uses a communication network 100 of the type describe above with respect to FIG. 2. FIG. 4 further shows that nodes 102-1 to 102-N are connected to a number of electronic devices 406-1 to 406-T. In one embodiment, electronic devices 406-1 to 406-T include sensors, processors, actuators, controllers, input devices and the like that communicate data in frames over network 100.

Figure 5:
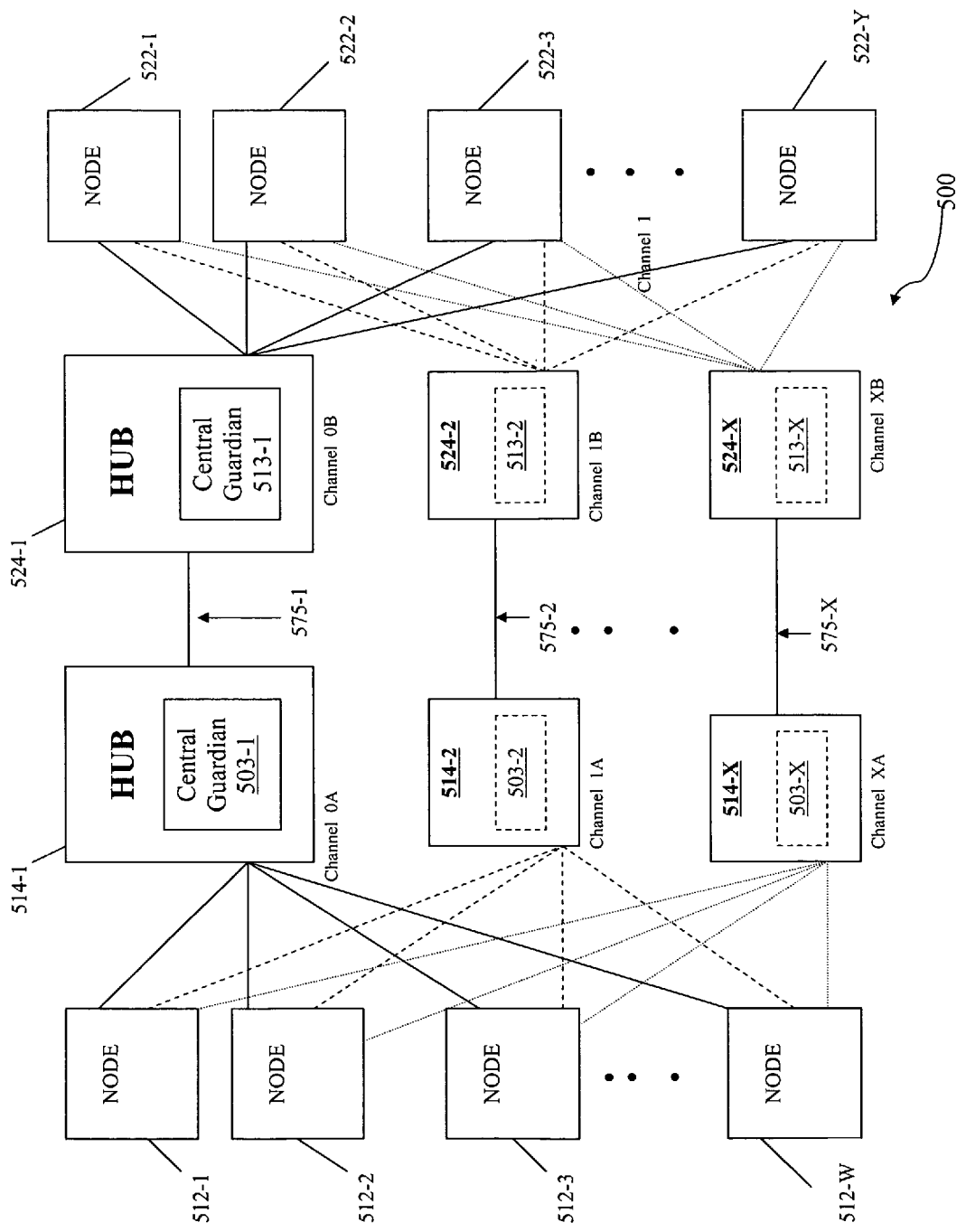
FIG. 5 is a block diagram of an alternate embodiment of a communication network according to the teachings of the present invention.

FIG. 5 is a block diagram of one embodiment of a hub-based communication network indicated at 500. In one embodiment, network 500 includes multiple hubs 514-1 to 514-X coupled to respective multiple hubs 524-1 to 524-X. In one embodiment, hubs 514-1 and 514-2 comprise an individual dual channel network operating over channels 0A and 1A, respectively. In addition, hubs 524-1 and 524-2 comprise an individual dual channel network operating over channels 0B and 1B, respectively. In one embodiment, these networks are coupled over communications links 575-1 and 575-2. For ease of discussion, network 500 will be described based on a dual channel multi-hub system comprising hubs 514-1 and 514-2 coupled to nodes 512-1 to 512-W over replicated channels 0A and 1A, respectively and hubs 524-1 and 524-2 coupled to nodes 522-1 to 522-Y over replicated channels 0B and 1B, respectively. It is understood that the concepts described are transferable to a multi-hub network having up to XA and XB replicated channels with nodes 512-1 to 512-W and nodes 522-1 to 522-Y, respectively.

In one embodiment, nodes 512-1 to 512-W and nodes 522-1 to 522-Y communicate with one another over two replicated communication channels 0A and 1A and 0B and 1B, respectively using a time-triggered communication protocol.

Communication Common or Disjointed

In one embodiment, multi-hub network 500 operates as described with respect to network 100 of FIG. 1 above. For example, hubs 514-1 and 514-2 with nodes 512-1 to 512-W perform schedule enforcement independently from hubs 524-1 and 524-2 with nodes 522-1 to 522-Y. In alternate embodiments, communication links 575-1 and 575-2 are included in the schedule enforcement and the guardian messages received by respective central guardians 103 and 113 include slot information for transmission.

In one embodiment, multi-hub network 500 executes transmissions with a common global transmission schedule. Hubs 514-1 and 514-2 with nodes 512-1 to 512-W and hubs 524-1 and 524-2 with nodes 522-1 to 522-Y communicate using the common global transmission schedule. In one embodiment, nodes 512-1 to 512-W are local to hubs 514-1 and 514-2 and operate over one of more of the same slots as nodes 522-1 to 522-Y that are local to hubs 524-1 and 524-2. For example, in one embodiment, node 522-1 communicates in a first slot of the transmission schedule over channels 0A and 1A while one of nodes 522-1 to 522-Y communicates in the first slot of the transmission over channels 0B and 1B. In alternate embodiments, this operation is expandable to X hubs over X channels.

In operation guardian messages received by hubs 514-1 and 514-2 indicate the one or more slots to communicate next and on a per channel basis are voted as described above. In this embodiment, guardian messages received by hubs 524-1 and 524-2 indicate the one or more slots to communicate next and include guardian messages from hubs 514-1 and 514-2 for transmission over links 575-1 and 575-2. As a result, in one embodiment, communication links 575-1 and 575-2 are included in the schedule enforcement. It is understood that each of the hubs 514 and 524 act as nodes at particular times for transmission schedule enforcement.

In alternate embodiments, both hubs 514 or 524 operate as a master and transmission over communication links 575-1 and 575-2 is included in the schedule enforcement.

In one embodiment, the HUB networks of FIGS. 1-5 implement time synchronization.

Advantages of the present invention include:
a. Removal of the tool issues relating to Central Guardian Schedule Table development and verification of Central Guardian Schedule correctness.
b. Reduction in complexity of a central guardian relieving it from the need to store and utilize Central Guardian Schedule Table information.
c. Reduction in hub-state space and susceptibility to single event upset (SEU). In one embodiment, single event upset is based on upsets induced by high energy neutrons. Embodiments of the present invention reduce SEU by having no required schedule position related state for a guardian to keep track of. Therefore, there is no state to be upset.
d. Removal of Guardian's semantic dependency on protocol state signals:
  i. Enabling of the Central Guardian to enforce across TDMA Protocol Mode changes that result in different transmission order, without the hub processing mode change signals.
  ii. Enabling of Multiplexed Nodes to shared TDMA Slots, without the hub following schedule position.

Embodiments of the present invention provide methods of transmission schedule enforcement and reduce the amount of information that is loaded in the guardian at design time or physically loaded when the system is undergoing maintenance. Instead of being loaded externally and stored within a centralized guardian the information is dynamically transferred from the nodes.

In another embodiment, when the voting action of the schedule enforcement does not yield a clear winner the central guard takes alternate action. In one embodiment, when a clear winner is not indicated a respective central guardian implements an arbitration function and determines what port transmits next. The arbitration function is any suitable arbitration function. In one embodiment, when no clear winner is indicated an arbitration function is performed that is based on arbitration. In another embodiment, when no clear winner is indicated, the guardian blocks all nodes from propagating during the next slot, slots or round.

What is claimed is:

1. A method of transmission schedule enforcement in a hub-based network, the method comprising:
receiving guardian messages from one or more of a plurality of nodes, wherein the guardian messages are embedded in data communications;
extracting the guardian messages from the data communications;
voting the received guardian messages using a voting function; and
wherein the guardian messages contain information pertaining to the node or nodes that have been scheduled to transmit in a next slot or slots;
when a clear winner of the voted guardian messages is detected, enabling one or more ports determined based upon the information contained within the guardian message of the clear winner to propagate.

2. The method of claim 1, further comprising communicating data over half-duplex communication links.

3. The method of claim 1, wherein the information contained in the guardian messages includes slot length of the next one or more.

4. The method of claim 1, further comprising retrieving the one or more ports to propagate from a slot to guardian port look up table.

5. The method of claim 1, further comprising when a winner of the voted guardian messages is not detected, implementing an arbitration function, selecting a guardian message, retrieves one or more ports to propagate next from a slot to guardian port look up table based on the one or more slots of the selected guardian message and enabling the one or more ports to propagate.

6. The method of claim 1, wherein voting the received guardian messages using a voting function comprising voting the received guardian messages using a fault tolerant voting function.

7. The method of claim 1, further comprising when a winning guardian message is not detected blocking transmissions.

8. A method of transmission schedule enforcement in a hub-based network, the method comprising:
receiving guardian messages from one or more of a plurality of nodes, wherein the guardian messages are embedded in data communications;
extracting the guardian messages from the data communications;
wherein each of the guardian messages contains a portion of a complete transmission schedule, wherein each portion partially overlaps the next portion;
comparing the overlaps of consecutive portions of the complete transmission schedule; and
when the overlap portions agree, assembling the portions of the complete transmission schedule;
executing the assembled transmission schedule.

* * * * *